(12) United States Patent  (10) Patent No.: US 8,688,576 B2
Hanson et al.  (45) Date of Patent: Apr. 1, 2014

(54) BILL CONTROL

(75) Inventors: Carrie Anne Hanson, Charlotte, NC (US); Scott R. Enscoe, Charlotte, NC (US); Alexander C. Wittkowski, Charlotte, NC (US); David M. Grigg, Rock Hill, SC (US); Daniel David, Charlotte, NC (US); Katherine Dintenfass, Charlotte, NC (US); Brett Newman, Burlingame, CA (US); Leo Kopelow, San Francisco, CA (US); Yameng Li, Berkeley, CA (US); Nicole Chen, San Francisco, CA (US); Nicholas Sharp, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/543,694

(22) Filed: Jul. 6, 2012

(65) Prior Publication Data

US 2014/0012744 A1  Jan. 9, 2014

(51) Int. Cl.
*G06Q 40/00* (2012.01)
(52) U.S. Cl.
USPC ............................................. 705/40; 705/35
(58) Field of Classification Search
USPC .................................................... 705/35, 40
See application file for complete search history.

(56) References Cited

U.S. PATENT DOCUMENTS 5,699,528 A * 12/1997 Hogan ............................ 705/40
7,945,240 B1 * 5/2011 Klock et al. .................. 455/406
8,145,568 B2    3/2012 Rackley, III et al.
8,160,959 B2    4/2012 Rackley, III et al.
2007/0100749 A1  5/2007 Bachu et al.
2011/0066445 A1  3/2011 Klain et al.
2012/0078732 A1  3/2012 Heller
2012/0078764 A1  3/2012 Ross et al.
2012/0078781 A1  3/2012 Ross et al.
2012/0095852 A1  4/2012 Bauer et al.

FOREIGN PATENT DOCUMENTS

CN     201355494 Y   12/2009
CN     102214336 A   10/2011
JP     2011222008 A  11/2011

OTHER PUBLICATIONS

Mukherjee, Amit; Nayak, Mahesh; Alvares, Clifford; Mahalingam, TV; Deepti Khanna Bose. "Money News"; Business Today; Dec. 17, 2006.*

Anonymous; "Media Digest"; Marketing, supple. Media Digest; 2005/2006.*

* cited by examiner

*Primary Examiner* — Edward Chang
(74) *Attorney, Agent, or Firm* — Michael A. Springs; Moore & Van Allen, PLLC; Sreenivas Vedantam

(57) ABSTRACT

Embodiments of the invention are directed to systems, methods and computer program products for implementing bill control. The invention enables a user of a financial institution account to maintain controls over bills via a single interaction point. In some embodiments, a method comprises determining whether a bill is due within a predetermined period; in response to determining the bill is due within the predetermined period: initiating, via a mobile network, presentation of a duration in which the bill is due; initiating, via the mobile network, presentation of an option to authorize payment of the bill via the mobile network; and in response to receiving selection of the option to pay the bill, authorizing payment of the bill via a financial institution account.

20 Claims, 6 Drawing Sheets

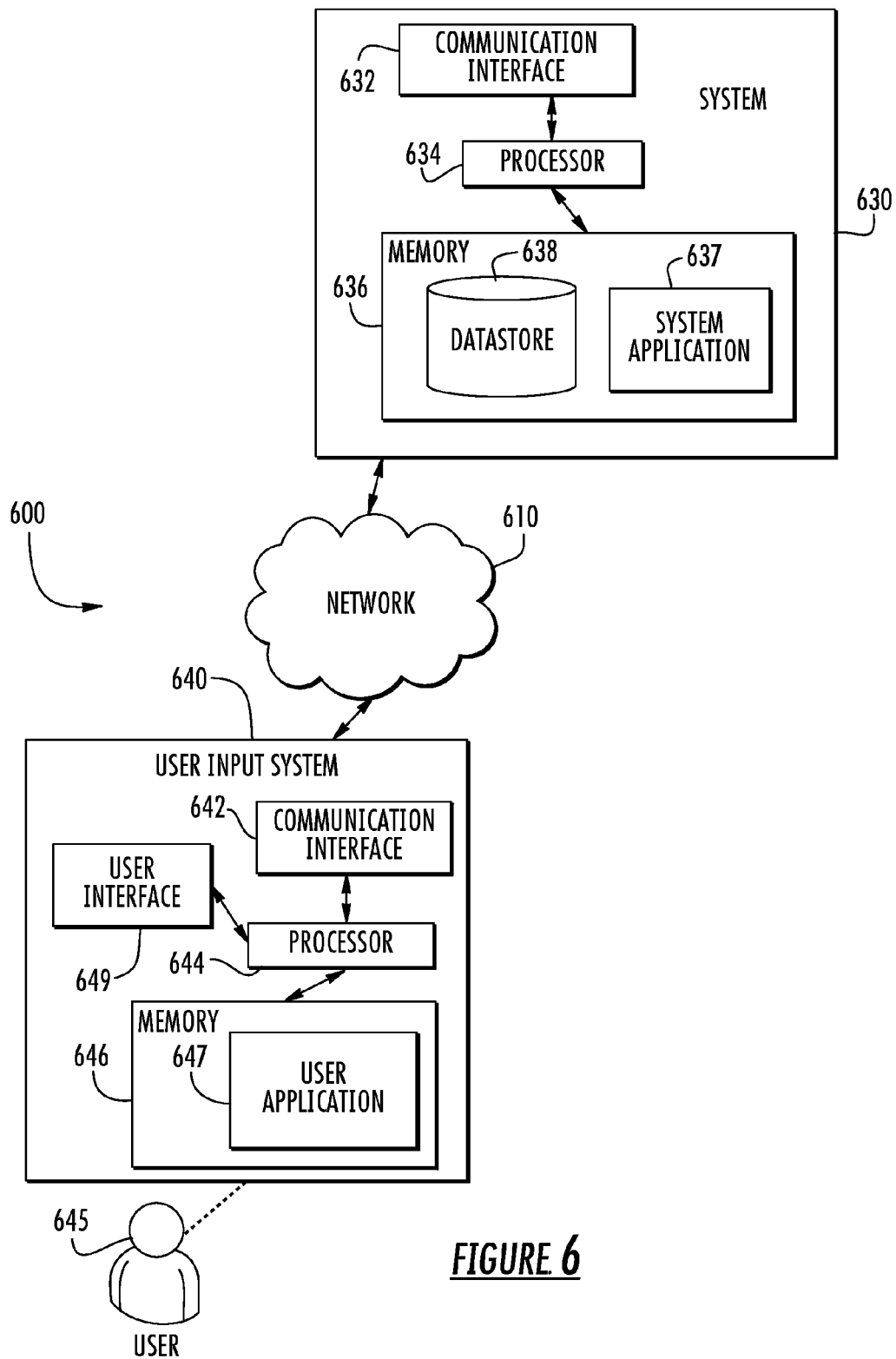

BILL CONTROL

BACKGROUND

There is a need for a system that enables bill payment without requiring a user to remember due dates associated with bills.

BRIEF SUMMARY

Embodiments of the invention are directed to systems, methods and computer program products for implementing bill control.

In some embodiments, an apparatus is provided for implementing bill control. The apparatus comprises: a memory; a processor; and a module stored in the memory, executable by the processor, and configured to: determine whether a bill is due within a predetermined period; in response to determining the bill is due within the predetermined period: initiate, via a mobile network, presentation of a duration in which the bill is due; and initiate, via the mobile network, presentation of an option to authorize payment of the bill via the mobile network; and in response to receiving selection of the option to pay the bill, authorize payment of the bill via a financial institution account.

In some embodiments, the bill is a first bill, and the module is further configured to: determine whether a second bill is due within the predetermined period; in response to determining the second bill is due within the predetermined period: initiate, via the mobile network, presentation of a second duration in which the second bill is due; and initiate, via the mobile network, presentation of a second option to authorize payment of the second bill via the mobile network.

In some embodiments, the option to pay the bill comprises a first option to pay the bill instantly.

In some embodiments, the option to pay the bill comprises a second option to pay the bill after a payment is credited to the financial institution account.

In some embodiments, the option to pay the bill comprises a third option to pay the bill on a day when the bill is due.

In some embodiments, the option to pay the bill comprises a fourth option to pay the bill based on a customized schedule determined by a user of the financial institution account.

In some embodiments, the module configured to authorize comprises the module configured to authenticate to the financial institution account.

In some embodiments, the module configured to initiate comprises the module configured to initiate, via the mobile network, presentation of the option to pay the bill via the mobile network prior to authenticating to the financial institution account.

In some embodiments, the module is further configured to initiate presentation of a confirmation prompt prior to authorizing payment of the bill via the financial institution account, wherein the confirmation prompt presents an amount associated with the bill and a balance associated with the financial institution account. In some embodiments, the amount is at least one of automatically populated or input by a user.

In some embodiments, the bill is at least one of a recurring or non-recurring bill.

In some embodiments, the duration is presented pictorially.

In some embodiments, the module is further configured to: determine whether the bill has been paid for which payment has been authorized; and in response to determining the bill for which payment has been authorized has not been paid, initiate, via the mobile network, presentation of information associated with the bill.

In some embodiments, the information comprises authorization information (e.g., information that describes when authorization was provided by the user, information that describes when the bill will be paid, etc.).

In some embodiments, the bill for which payment has been authorized but has not been paid is presented on a user interface along with a second bill for which payment has not yet been authorized.

In some embodiments, the module is further configured to initiate presentation of a second option to authorize payment for multiple bills via a single selectable option.

In some embodiments, information regarding the payment of the bill (e.g., information regarding the one or more options to pay the bill) is received prior to the receiving selection of the option to pay the bill.

In some embodiments, information regarding the payment of the bill (e.g., information regarding the one or more options to pay the bill) is received after the receiving selection of the option to pay the bill.

In some embodiments, information regarding a user's handling of the bill is transmitted to a merchant associated with the bill.

In some embodiments, a method is provided for implementing bill control. The method comprises: determining whether a bill is due within a predetermined period; in response to determining the bill is due within the predetermined period: initiating, via a mobile network, presentation of a duration in which the bill is due; initiating, via the mobile network, presentation of an option to authorize payment of the bill via the mobile network; and in response to receiving selection of the option to pay the bill, authorizing payment of the bill via a financial institution account.

In some embodiments, a computer program product is provided for implementing bill control. The computer program product comprises: a non-transitory computer-readable medium comprising a set of codes for causing a computer to: determine whether a bill is due within a predetermined period; in response to determining the bill is due within the predetermined period: initiate, via a mobile network, presentation of a duration in which the bill is due; and initiate, via the mobile network, presentation of an option to authorize payment of the bill via the mobile network; and in response to receiving selection of the option to pay the bill, authorize payment of the bill via a financial institution account.

BRIEF DESCRIPTION OF THE DRAWINGS

Figure 1:
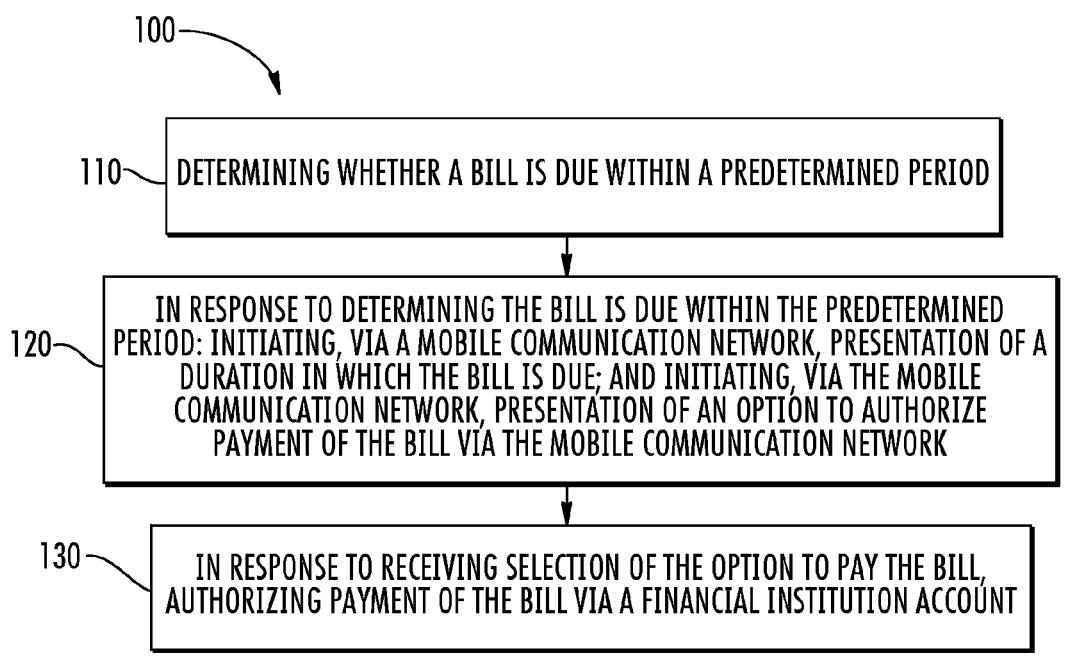
Figure 2:
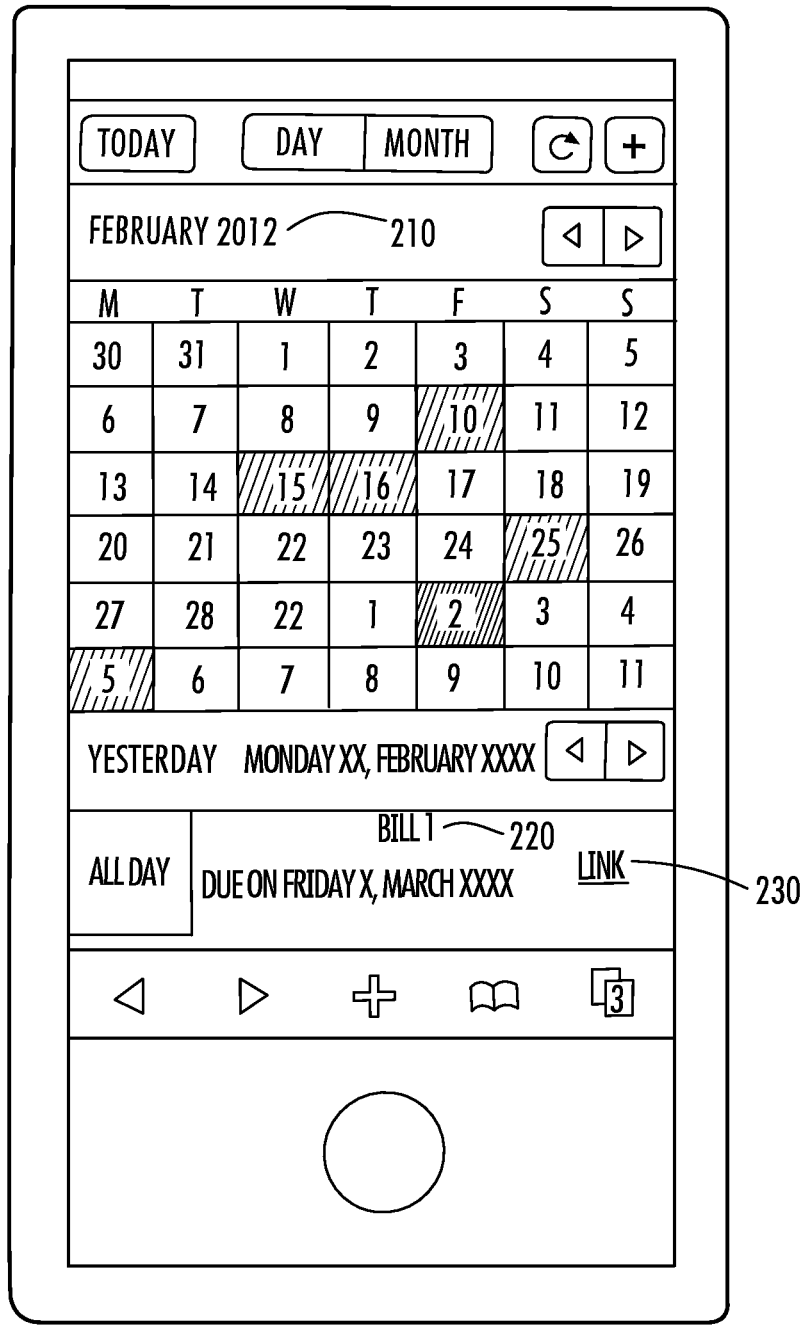
Figure 3:
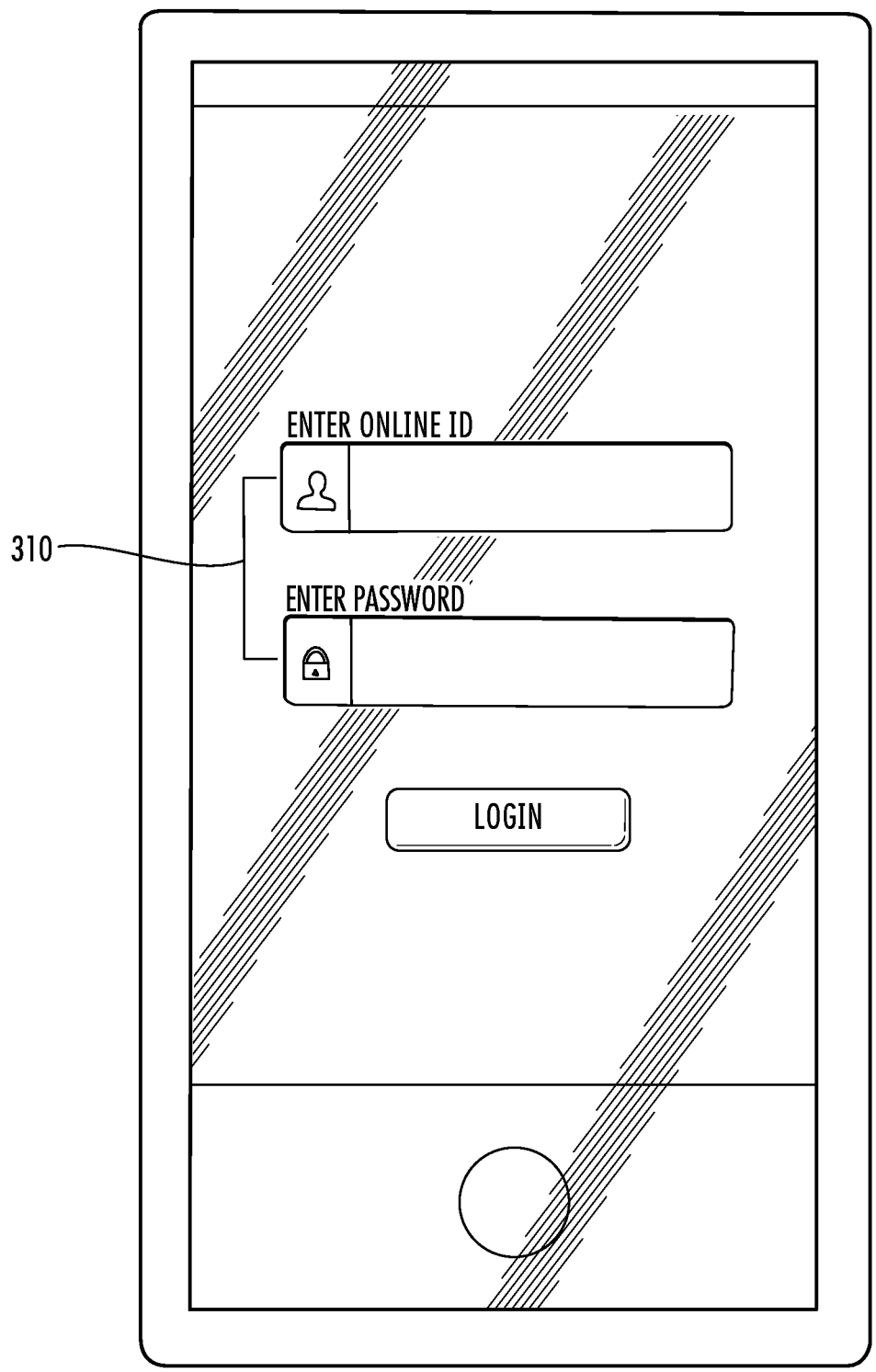
Figure 4:
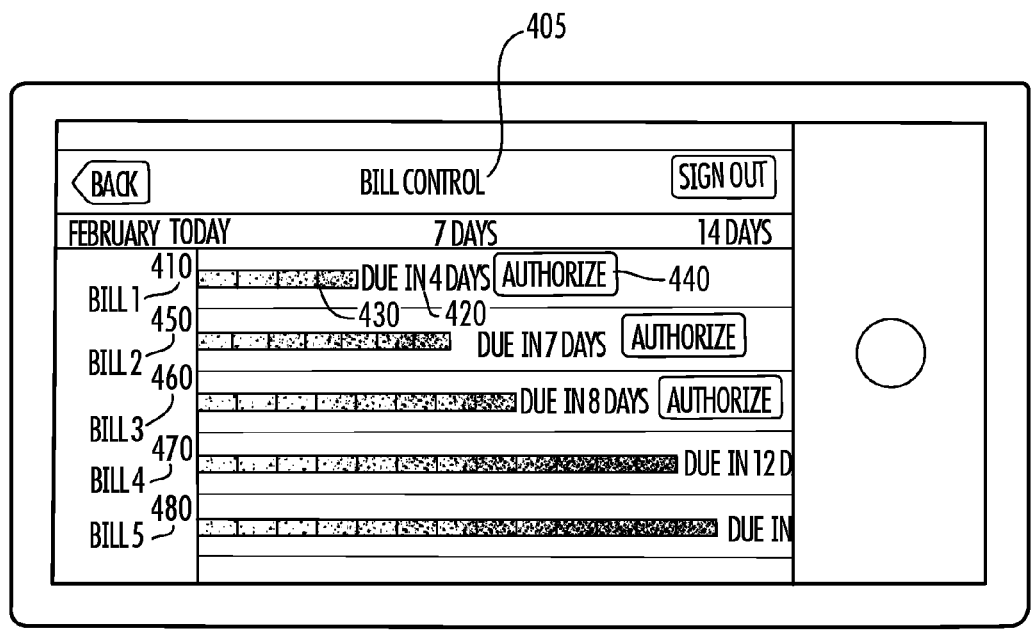
Figure 5:
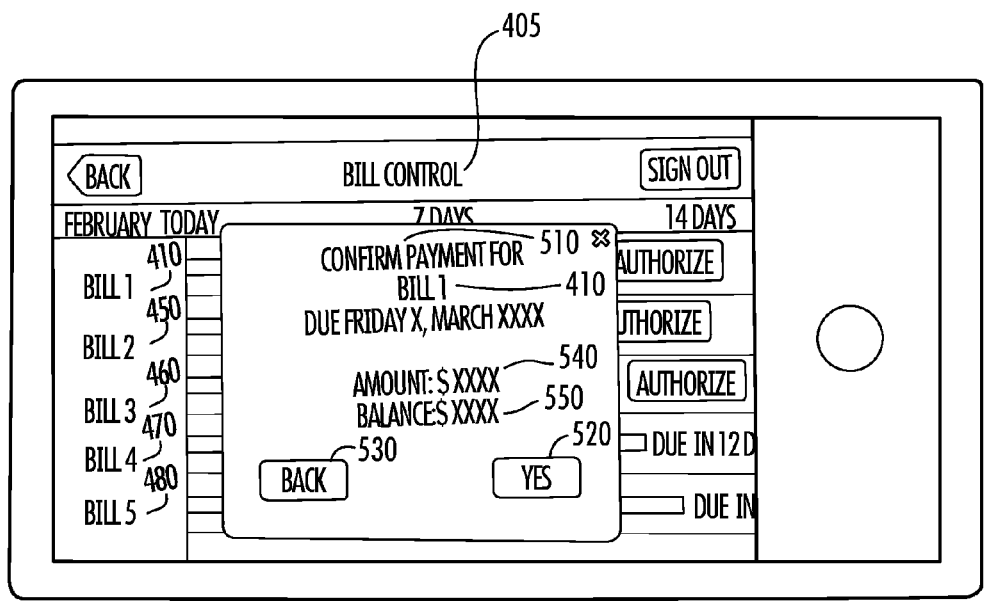

Having thus described embodiments of the invention in general terms, reference will now be made to the accompanying drawings, where:

FIG. 1 is a flowchart illustrating a general process flow for implementing bill control, in accordance with embodiments of the present invention;

FIG. 2 is a user interface associated with implementing bill control, in accordance with embodiments of the present invention;

FIG. 3 is another user interface associated with implementing bill control, in accordance with embodiments of the present invention;

FIG. 4 is another user interface associated with implementing bill control, in accordance with embodiments of the present invention;

FIG. 5 is another user interface associated with implementing bill control, in accordance with embodiments of the present invention; and FIG. 6 is a block diagram illustrating technical components of a system for implementing bill control, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for implementing bill control. Embodiments of the invention provide a single interaction point for bill payment. Additionally, embodiments of the invention provide a user with control over bills without the hassle of remembering bill due dates. Still additionally, embodiments of the invention provide a holistic and current view of bill payments that are due in the future. Still additionally, embodiments of the invention provide users with flexibility over when bills are paid.

As mobile device interaction becomes the primary mode of interaction with a financial institution account, embodiments of the invention enable users to avoid automatic bill payments by enabling control over when the bills are paid. The bill control system enables a user to pay several bills at once, pay a bill instantly, pay a bill a certain period after a payment (e.g., a salary, a payment greater than a threshold amount, a recurring payment, etc.) is credited to the user's financial institution account, pay bills based on a scattered or customized schedule during a month, etc.

The invention addresses perceived accuracy limitations of bill payment via a mobile device. Additionally, the invention reduces service calls from users requesting help in managing issues associated with bill payment transactions. The invention also helps to increase mobile adoption of services provided by a financial institution and reduces the cost associated with bill payment to both the user and the financial institution.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, etc. The account is associated with and/or maintained by the entity. In other embodiments, an entity may not be a financial institution. In still other embodiments, the entity may be the merchant itself (e.g., the merchant that transmits a bill to the user).

In some embodiments, the "user" may be a customer (e.g., an account holder or a person who has an account (e.g., banking account, credit account, etc.) at the entity) or potential customer (e.g., a person who has submitted an application for an account, a person who is the target of marketing materials that are distributed by the entity, a person who applies for a loan that not yet been funded).

As used herein, a mobile device may be any portable mobile communication or computing device. As used herein, a user interface is a user interface associated with a mobile device. As used herein, a mobile network may be any network (e.g., data network, communication network, etc.) via which the mobile device connects to a financial institution account or to the bill control feature or service associated with the financial institution account. The network may be a local area network (LAN), a wide area network (WAN), and/or a global area network (GAN), such as the Internet. The network may be secure and/or unsecure and may also include wireless and/or wireline and/or optical interconnection technology.

Referring now to FIG. 1, a general process flow 100 is provided for implementing bill control. At block 110, the method comprises determining whether a bill is due within a predetermined period. At block 120, the method comprises in response to determining the bill is due within the predetermined period: initiating, via a mobile network, presentation of a duration in which the bill is due; and initiating, via the mobile network, presentation of an option to authorize payment of the bill via the mobile network. At block 130, the method comprises in response to receiving selection of the option to pay the bill, authorizing payment of the bill via a financial institution account.

Referring now to FIG. 2, FIG. 2 presents a calendar 210 on a user interface of a mobile device. The user interface indicates that a bill 220 (e.g., a utilities bill) is due on a certain date. Additionally, the user interface presents a selectable link 230, which when selected enables a user to pay the bill 220 or schedule a payment for the bill 220. In some embodiments, the selectable link 230 is presented prior to a user authenticating to the user's financial institution account. In some embodiments, the bill 220 is a recurring bill (e.g., utilities bill). In other embodiments, the bill 220 is a non-recurring bill (e.g., a bill associated with purchase from a grocery store).

Referring now to FIG. 3, FIG. 3 is a user interface associated with implementing bill control, in accordance with embodiments of the present invention. When the user selects the selectable link to pay the bill, the user is forwarded to a user interface that prompts the user to enter authentication credentials 310 (e.g., a username, a password, etc.). As indicated in FIG. 3, the authentication credentials 310 may be authentication credentials associated with the user's financial institution account. In some embodiments, the authentication credentials 310 may be authentication credentials associated with the bill control service after authenticating into the financial institution account.

Referring now to FIG. 4, FIG. 4 is another user interface 405 associated with implementing bill control, in accordance with embodiments of the present invention. As indicated in FIG. 4, FIG. 4 presents a list of bills 410, 450, 460, 470, 480 that are due within a predetermined period (e.g., the next 15 days). The bills are presented in ascending order such that bills that are due sooner are presented at the top of the list and bills that are due later are presented towards the bottom of the list. In some embodiments, the bill control user interface 405 presents bills that have not yet been paid. In some embodiments, the user interface 405 presents bills that have not yet been authorized and have not yet been paid. Additionally, the user interface 405 presents bills that have been authorized and have not yet been paid. In some embodiments, the user may reach the user interface 405 via the user's financial institution account and without linking from the calendar interface presented previously.

For each bill, the user interface presents the name of the bill 410. The name of the bill may be a name that was assigned by the user of the financial institution account. Alternatively, the name of the bill may be the name of the source (e.g., utilities company, rent company, mobile telecommunication company, etc.) associated with the bill. The user interface also presents the number of days 420 within which the bill is due. The number of days may be presented as text 420. Additionally or alternatively, the number of days may also be presented pictorially 430. As presented in FIG. 4, each bar represents a day before which the bill is due. Additionally, the bars may be shaded from lighter shading to darker shading. The average shading of the bars associated with a bill that has a later due date is darker than the average shading of the bars associated with a bill that has an earlier due date.

Additionally, for each bill, the user interface presents a selectable option 440 to authorize payment associated with the bill. The selectable option 440 may comprise at least one of a first option to pay the bill instantly, a second option to pay the bill a predetermined period after a payment is credited to the financial institution account, a third option to pay the bill on a day when the bill is due, or a fourth option to pay the bill based on a customized schedule determined by a user of the financial institution account. In some embodiments, another option is an option to present a reminder to the user in the future. When the user selects the reminder option, a reminder is presented to the user after a predetermined period or a predetermined period before the bill payment amount is due. In some embodiments, the type of option (or information regarding how the user wishes to pay the bill) is pre-configured or pre-defined by the user such that when the user selects the selectable option 440, the payment is automatically authorized based on the pre-configured information or a confirmation page is presented as described herein. In other embodiments, the type of option is selected by the user upon the user's selection of the selectable option 440. In still other embodiments, the user defines how the user wishes to pay the bill (e.g., the date of payment, the number of installments for payment, payment amount, payment method, etc.) upon the user's selection of the selectable option 440. The payment amount may be at least one of greater than, equal to, or less than the amount due for the bill. The payment method may include payment via credit card, debit card, check via mail, electronic funds transfer via financial institution account, etc. In some embodiments, the payment method may include transmitting a payment to an alias associated with the merchant. For example, the alias may comprise a phone number, email address, or social networking identification information associated with the merchant. The financial institution receives the payment information and the alias and determines that the alias is associated with the merchant, and consequently determines that the payment is to be routed to the merchant (e.g., a financial institution account associated with the merchant). In some embodiments, the user interface 405 includes a single selectable option to authorize payment associated with multiple bills.

Referring now to FIG. 5, FIG. 5 is another user interface associated with implementing bill control, in accordance with embodiments of the present invention. This user interface may be referred to as a confirmation prompt 510. This confirmation prompt 510 is presented after the user selects an option to authorize payment for the bill 410. The user can either confirm 520 or not confirm 530 payment of the bill. Additionally, the amount 540 of the bill 410 is either automatically populated or is manually input by the user. For example, if the bill 410 is electronically linked to the source (e.g., utilities company) that transmitted the bill to user's financial institution account and is therefore automatically received by the user's financial institution account, the bill amount 540 may be automatically populated. If the bill 410 is not electronically linked to the bill's source and is therefore not automatically received by the user's financial institution account, the bill amount 540 is not automatically populated. In such an instance, the user needs to manually input the amount of the bill. Although the bill 410 is not linked to the bill's source, the bill 410 is presented on the bill control user interface 405 because the user may have pre-configured or pre-defined information associated with the bill 410 such that the bill 410 is presented (e.g., on a recurring basis) on the bill control user interface 405. Alternatively, the bill 410 may be electronically linked to the source that transmitted the bill 410 to the user's financial institution account; however, the bill payment amount 540 may not have been transmitted to the user's financial institution account along with the bill 410.

Additionally, the balance 550 of the account is presented in the confirmation prompt. This balance 550 may be the balance either before or after the bill payment is authorized. If the balance 550 is the balance after the bill payment is authorized, the amount 540 of the bill payment is deducted from the balance 550 presented to the user.

In some embodiments, the bill that is transmitted to the user (either a physical bill or electronic bill) comprises readable indicia (e.g., Quick Response (QR) code, barcode, radio frequency identification (RFID) tag, near field communication (NFC) tag, etc.). When the readable indicia (e.g., RFID tag, NFC tag, etc.) is scanned by the mobile device or when an image of the readable indicia (e.g., QR code, barcode, etc.) is captured by the mobile device, information regarding the bill may be loaded and/or processed by the mobile device. This information includes the bill name, bill identification number, merchant associated with the bill, bill due date, bill payment options, bill amount, past due amount, previous overpayments, etc. The mobile device may add the bill to the various user interfaces described herein either with or without user confirmation.

The mobile device also communicates information to the merchant either directly from the mobile device via a network, or via a system (e.g., external server) associated with the financial institution. The mobile device may send information to the merchant regarding the user's handling of the bill. For example, the mobile device may send a message to the merchant when the user views a bill associated with the merchant on the user's mobile device. Additionally, the mobile device may send a message to the merchant when the user selects an option to pay the bill. Exemplary options include options to pay the bill instantly, pay the bill a predetermined period after a payment is credited to the financial institution account, pay the bill on a day when the bill is due, pay the bill based on a customized schedule determined by a user of the financial institution account, present a reminder to the user after a predetermined period or a predetermined period before the bill is due, etc. Exemplary options also include an option to select an account from which to pay the bill. The message may include information associated with how the user will pay for the bill (e.g., the date of payment, the number of installments for payment, payment amount, payment method, etc.).

As an example, when a user pays a bill immediately, information associated with the bill payment is communicated from the mobile device to the merchant so that the merchant knows how much the user has paid, the method of payment, etc. This information is useful to the merchant because the merchant may not receive the paid amount from the financial institution until the user's bill payment is processed and the funds are settled. As another example, when a user schedules a bill payment for a predetermined date in the future, this information is communicated to the merchant so that the merchant knows when to expect the bill payment from the user. As a further example, when the user inputs the payment method as a first type of payment method (e.g., debit card), the merchant may send a message (via email, text message, social networking message, etc.) to the user indicating alternate options (e.g., electronic funds transfer) to pay the bill. As a further example, the merchant's message may indicate that the user will receive a discount (and may indicate the discount amount) and/or other rewards (e.g., reward points) if the user pays via one of the alternate options proposed by the merchant. As a further example, when the user inputs a payment amount different from the bill amount, the merchant may send a message to the user indicating that the user has chosen to pay an amount different from the bill amount. In some embodiments, the user may select an option to pay via foreign currency. The merchant may send a message to the user indicating the exchange rate so that the user can determine whether the user still wishes to pay via foreign currency.

Referring now to FIG. 6, FIG. 6 presents an exemplary block diagram of the system environment 600 for implementing the process flow 100 described in FIG. 1, in accordance with embodiments of the present invention. As illustrated, the system environment 600 includes a network 610, a system 630, and a user input system 640. Also shown in FIG. 6 is a user 645 of the user input system 640. The user input system 640 may be a mobile device described herein. The user 645 may be a person who uses the user input system 640 to execute a user application 647. The user application 647 may be an application to access a financial institution account or a bill control service associated with the financial institution account. The user application 647 and/or the system application 637 may incorporate or enable one or more parts of the process flow 100 or any of the user interfaces described herein.

As shown in FIG. 6, the system 630, and the user input system 640 are each operatively and selectively connected to the network 610, which may include one or more separate networks. In addition, the network 610 may include a local area network (LAN), a wide area network (WAN), and/or a global area network (GAN), such as the Internet. It will also be understood that the network 610 may be secure and/or unsecure and may also include wireless and/or wireline and/or optical interconnection technology.

The user input system 640 may include any computerized apparatus that can be configured to perform any one or more of the functions of the user input system 640 described and/or contemplated herein. For example, the user 645 may use the user input system 640 to transmit and/or receive information or commands to and from the system 630. In some embodiments, for example, the user input system 640 may include a personal computer system, a mobile computing device, a personal digital assistant, a mobile phone, a network device, and/or the like. As illustrated in FIG. 6, in accordance with some embodiments of the present invention, the user input system 640 includes a communication interface 642, a processor 644, a memory 646 having an user application 647 stored therein, and an user interface 649. In such embodiments, the communication interface 642 is operatively and selectively connected to the processor 644, which is operatively and selectively connected to the user interface 649 and the memory 646. In some embodiments, the user 645 may use the user application 647 to execute processes described with respect to the process flows described herein.

Each communication interface described herein, including the communication interface 642, generally includes hardware, and, in some instances, software, that enables the user input system 640, to transport, send, receive, and/or otherwise communicate information to and/or from the communication interface of one or more other systems on the network 610. For example, the communication interface 642 of the user input system 640 may include a wireless transceiver, modem, server, electrical connection, and/or other electronic device that operatively connects the user input system 640 to another system such as the system 630. The wireless transceiver may include a radio circuit to enable wireless transmission and reception of information.

Each processor described herein, including the processor 644, generally includes circuitry for implementing the audio, visual, and/or logic functions of the user input system 640. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 647 of the memory 646 of the user input system 640.

Each memory device described herein, including the memory 646 for storing the user application 647 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 6, the memory 646 includes the user application 647. In some embodiments, the user application 647 includes an interface for communicating with, navigating, controlling, configuring, and/or using the user input system 640. In some embodiments, the user application 647 includes computer-executable program code portions for instructing the processor 644 to perform one or more of the functions of the user application 647 described and/or contemplated herein. In some embodiments, the user application 647 may include and/or use one or more network and/or system communication protocols.

Also shown in FIG. 6 is the user interface 649. In some embodiments, the user interface 649 includes one or more output devices, such as a display and/or speaker, for presenting information to the user 645. In some embodiments, the user interface 649 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 645. In some embodiments, the user interface 649 includes the input and display devices of a mobile device, which are operable to receive and display information.

FIG. 6 also illustrates a system 630, in accordance with an embodiment of the present invention. The system 630 may include any computerized apparatus that can be configured to perform any one or more of the functions of the system 630 described and/or contemplated herein. In accordance with some embodiments, for example, the system 630 may include a computer network, an engine, a platform, a server, a database system, a front end system, a back end system, a personal computer system, and/or the like. Therefore, the system 630 may be a server managed by the financial institution. In some embodiments, such as the one illustrated in FIG. 6, the system 630 includes a communication interface 632, a processor 634, and a memory 636, which includes a system application 637 and a datastore 638 stored therein. As shown, the communication interface 632 is operatively and selectively connected to the processor 634, which is operatively and selectively connected to the memory 636.

It will be understood that the system application 637 may be configured to implement any one or more portions of the various user interfaces and/or process flow described herein. The system application 637 may interact with the user application 647. It will also be understood that, in some embodiments, the memory includes other applications. It will also be understood that, in some embodiments, the system application 637 is configured to communicate with the datastore 638, the user input system 640, etc.

It will be further understood that, in some embodiments, the system application 637 includes computer-executable program code portions for instructing the processor 634 to perform any one or more of the functions of the system application 637 described and/or contemplated herein. In some embodiments, the system application 637 may include and/or use one or more network and/or system communication protocols.

In addition to the system application 637, the memory 636 also includes the datastore 638. As used herein, the datastore 638 may be one or more distinct and/or remote datastores. In some embodiments, the datastore 638 is not located within the system and is instead located remotely from the system. In some embodiments, the datastore 638 stores information or data described herein. For example, the datastore 638 may store information associated with the user's financial institution account, bills, due dates associated with bills, etc.

It will be understood that the datastore 638 may include any one or more storage devices, including, but not limited to, datastores, databases, and/or any of the other storage devices typically associated with a computer system. It will also be understood that the datastore 638 may store information in any known way, such as, for example, by using one or more computer codes and/or languages, alphanumeric character strings, data sets, figures, tables, charts, links, documents, and/or the like. Further, in some embodiments, the datastore 638 may include information associated with one or more applications, such as, for example, the system application 637. It will also be understood that, in some embodiments, the datastore 638 provides a substantially real-time representation of the information stored therein, so that, for example, when the processor 634 accesses the datastore 638, the information stored therein is current or substantially current.

In alternate embodiments, the system 630 may be managed by the merchant, and not the financial institution. In some embodiments, there may be a system 630 managed by the merchant, and a separate system 630 managed by the financial institution. In some embodiments, the network 610 is a network to transmit information to and/or receive information from the merchant, and not the financial institution. Therefore in some embodiments, there may be a network 610 for the user input system 640 to communicate with the merchant, and a separate network 610 for the user input system 640 to communicate with the financial institution.

It will be understood that the embodiment of the system environment illustrated in FIG. 6 is exemplary and that other embodiments may vary. As another example, in some embodiments, the system 630 includes more, less, or different components. As another example, in some embodiments, some or all of the portions of the system environment 600 may be combined into a single portion. Likewise, in some embodiments, some or all of the portions of the system 630 may be separated into two or more distinct portions.

In addition, the various portions of the system environment 600 may be maintained for and/or by the same or separate parties. It will also be understood that the system 630 may include and/or implement any embodiment of the present invention described and/or contemplated herein. For example, in some embodiments, the system 630 is configured to implement any one or more of the embodiments of the process flow 100 described and/or contemplated herein in connection with FIG. 1 or any other process flow described herein. Additionally, the system 630 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

This application incorporates by reference in their entirety each of the following applications filed concurrently herewith:

U.S. application Ser. No. 13/543,644, entitled ELECTRONIC PROCESSING OF PAPER INVOICES, filed Jul. 6, 2012 to Carrie Hanson et al.;

U.S. application Ser. No. 13/543,676, entitled FINANCIAL DOCUMENT PROCESSING SYSTEM, filed Jul. 6, 2012 to Carrie Hanson et al.;

U.S. application Ser. No. 13/543,619, entitled TRANSACTION MONITORING AND SAVINGS FEATURE, filed Jul. 6, 2012 to Carrie Hanson et al.;

U.S. application Ser. No. 13/543,700, entitled BILL PAYMENT MANAGEMENT, filed Jul. 6, 2012 to Carrie Hanson et al.;

U.S. application Ser. No. 13/543,651, entitled EARNING REWARDS VIA BILL PAYMENT, filed Jul. 6, 2012 to Carrie Hanson et al.;

U.S. application Ser. No. 13/543,696, entitled FUTURE ACCOUNT VIEW, filed Jul. 6, 2012 to Carrie Hanson et al.; and U.S. application Ser. No. 13/543,649, entitled CALENDAR BILL PAYMENT MANAGEMENT, filed Jul. 6, 2012 to Carrie Hanson et al.

What is claimed is:

1. An apparatus for implementing bill control, the apparatus comprising:
   a memory;
   a processor; and
   a module stored in the memory, executable by the processor, and configured to:
   determine whether a bill is due within a predetermined period;
   receive and verify authentication credentials;
   in response to determining the bill is due within the predetermined period and in response to verifying the authentication credentials:
   initiate, via a mobile network, presentation of the bill in a list of bills;
   initiate, via the mobile network, presentation of a duration in which the bill is due, wherein the duration is illustrated as a graphical bar chart;

initiate, via the mobile network, presentation of an option to authorize payment of the bill via the mobile network;

in response to receiving selection of the option to pay the bill, initiate presentation of a pop-up window superimposed on the list of bills, wherein the pop-up window enables authorization of payment of the bill via a financial institution account, wherein a partial portion of the list of bills, but not the entire list of bills, is visible simultaneously with the pop-up window; and in response to receiving selection of the option to pay the bill, transmit a message to a merchant associated with the bill, wherein the message comprises a payment method for paying the bill.

2. The apparatus of claim 1, wherein the bill is a first bill, and wherein the module is further configured to:

determine whether a second bill is due within the predetermined period;

in response to determining the second bill is due within the predetermined period:

initiate, via the mobile network, presentation of a second duration in which the second bill is due; and initiate, via the mobile network, presentation of a second option to authorize payment of the second bill via the mobile network.

3. The apparatus of claim 1, wherein the option to pay the bill comprises a first option to pay the bill instantly.

4. The apparatus of claim 1, wherein the option to pay the bill comprises a second option to pay the bill after a payment is added to the financial institution account.

5. The apparatus of claim 1, wherein the option to pay the bill comprises a third option to pay the bill on a day when the bill is due.

6. The apparatus of claim 1, wherein the option to pay the bill comprises a fourth option to pay the bill based on a customized schedule determined by a user of the financial institution account.

7. The apparatus of claim 1, wherein the module configured to authorize comprises the module configured to authenticate to the financial institution account.

8. The apparatus of claim 7, wherein the module configured to initiate comprises the module configured to initiate, via the mobile network, presentation of the option to pay the bill via the mobile network prior to authenticating to the financial institution account.

9. The apparatus of claim 1, wherein the module is further configured to initiate presentation of a confirmation prompt prior to authorizing payment of the bill via the financial institution account, wherein the confirmation prompt presents an amount associated with the bill and a balance associated with the financial institution account.

10. The apparatus of claim 9, wherein the amount is at least one of automatically populated or input by a user.

11. The apparatus of claim 1, wherein the bill is at least one of a recurring or non-recurring bill.

12. The apparatus of claim 1, wherein the duration is presented pictorially.

13. The apparatus of claim 1, wherein the module is further configured to:

determine whether the bill has been paid for which payment has been authorized; and in response to determining the bill for which payment has been authorized has not been paid, initiate, via the mobile network, presentation of information associated with the bill.

14. The apparatus of claim 13, wherein the information comprises authorization information.

15. The apparatus of claim 13, wherein the bill for which payment has been authorized but has not been paid is presented on a user interface along with a second bill for which payment has not yet been authorized.

16. The apparatus of claim 1, wherein the module is further configured to initiate presentation of a second option to authorize payment for multiple bills via a single selectable option.

17. The apparatus of claim 1, wherein information regarding the payment of the bill is received at least one of prior to or after the receiving selection of the option to pay the bill.

18. The apparatus of claim 1, wherein the merchant, in response to receiving the message, sends a second message recommending a second payment method for paying the bill, wherein the second payment method produces a discount on the bill.

19. A method for implementing bill control, the method being performed by a computer and comprising:

determining, using a computing device processor, whether a bill is due within a predetermined period;

receiving and verifying, using a computing device processor, authentication credentials;

in response to determining the bill is due within the predetermined period and in response to verifying the authentication credentials:

initiating, via a mobile network and using a computing device processor, presentation of the bill in a list of bills;

initiating, via the mobile network and using a computing device processor, presentation of a duration in which the bill is due, wherein the duration is illustrated as a graphical bar chart;

initiating, via the mobile network and using a computing device processor, presentation of an option to authorize payment of the bill via the mobile network;

in response to receiving selection of the option to pay the bill, initiating, using a computing device processor, presentation of a pop-up window superimposed on the list of bills, wherein the pop-up window enables authorization of payment of the bill via a financial institution account, wherein a partial portion of the list of bills, but not the entire list of bills, is visible simultaneously with the pop-up window; and in response to receiving selection of the option to pay the bill, transmitting, using a computing device processor, a message to a merchant associated with the bill, wherein the message comprises a payment method for paying the bill.

20. A computer program product for implementing bill control, the computer program product comprising:

a non-transitory computer-readable medium comprising a set of codes for causing a computer to:

receive and verify authentication credentials;

determine whether a bill is due within a predetermined period;

in response to determining the bill is due within the predetermined period and in response to verifying the authentication credentials:

initiate, via a mobile network, presentation of the bill in a list of bills;

initiate, via the mobile network, presentation of a duration in which the bill is due, wherein the duration is illustrated as a graphical bar chart;

initiate, via the mobile network, presentation of an option to authorize payment of the bill via the mobile network;

in response to receiving selection of the option to pay the bill, initiate presentation of a pop-up window superimposed on the list of bills, wherein the pop-up window enables authorization of payment of the bill via a financial institution account, wherein a partial portion of the list of bills, but not the entire list of bills, is visible simultaneously with the pop-up window; and in response to receiving selection of the option to pay the bill, transmit a message to a merchant associated with the bill, wherein the message comprises a payment method for paying the bill.

\* \* \* \* \*